Patented June 6, 1933

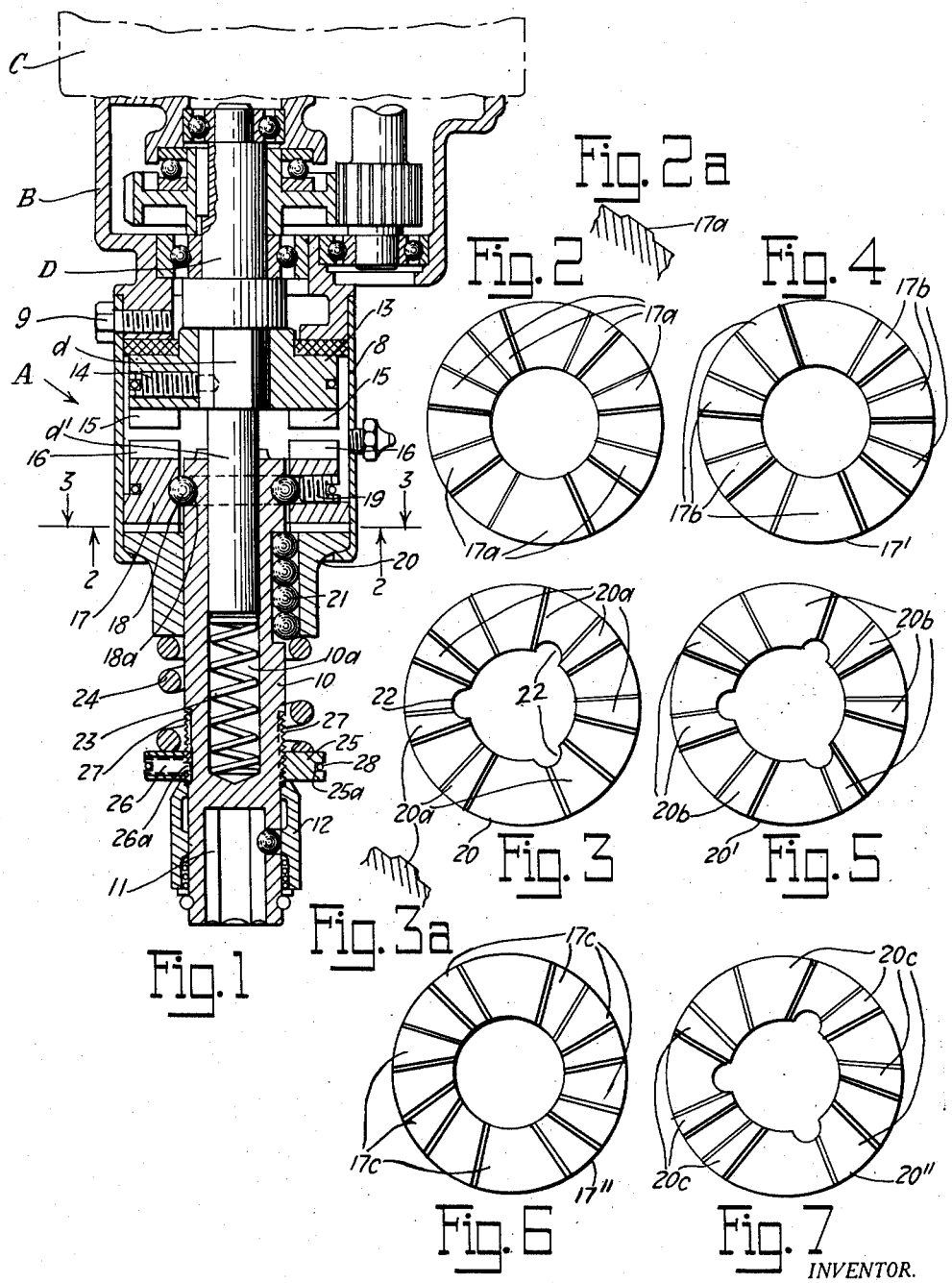

1,913,046

UNITED STATES PATENT OFFICE

WILLIAM H. CALLAN, OF CLEVELAND, OHIO, ASSIGNOR TO CHICAGO PNEUMATIC TOOL COMPANY, OF NEW YORK, N. Y., A CORPORATION OF NEW JERSEY

CLUTCH MECHANISM

Application filed September 21, 1928. Serial No. 307,513.

This invention relates to apparatus for driving threaded securing members such as screws, nuts and the like. More particularly it concerns clutch mechanism adaptable for use on both fixed and portable machines.

Among the objects of the invention are to release the securing member when the latter is driven home with a predetermined pressure, to relieve the operator of a portable machine and the supports of a fixed machine of shock when the predetermined resistance is offered by the securing member, to reduce wear and tear as well as breakage of the mechanism which results from frequent clutching and declutching when the machine is continued in operation after the securing member is driven home, and in general to provide improved clutch mechanism characterized by simplicity of structure and operation, by strength of parts and by economy in manufacturing and assembling costs.

In order to illustrate the invention, one concrete embodiment with modifications as to details thereof is shown in the accompanying drawing in which:

Fig. 1 is a longitudinal sectional view disclosing the clutch device and a fragmentary portion of a machine with which it may be used;

Fig. 2 is a plan view substantially on the line 2—2 of Fig. 1 showing the arrangement of clutch teeth on the lower face of the intermediate coupling member;

Fig. 2a is a fragmentary sectional view indicating the contour of one of the teeth on the member shown in Fig. 2;

Fig. 3 is a plan view substantially on the line 3—3 of Fig. 1 showing the clutch teeth on the upper face of the shaft coupling member;

Fig. 3a is a fragmentary sectional view showing one of the teeth on the member shown in Fig. 3;

Figs. 4 and 6 are views similar to Fig. 2 showing different arrangements of clutch teeth for the lower face of the intermediate coupling member;

Figs. 5 and 7 are views similar to Fig. 3 showing different arrangements of clutch teeth for the upper face of the shaft member corresponding to those shown in Figs. 4 and 6 respectively.

The embodiment of the invention chosen for the purpose of illustration is shown in Fig. 1 as a complete clutch assembly A secured to the gear case B of a prime mover, such as an electric motor C which may comprise part either of a portable or of a fixed machine. A rotatable spindle D projects from gear case B and is provided with a polygonally shaped portion $d$ and a reduced cylindrical extension $d'$.

Clutch device A itself is housed in a metallic casing 8 comprising one or more parts attached to gear case B in any suitable manner as by cap screws 9 and encloses portions $d$ and $d'$ of spindle D. A tool shaft 10 is movably supported by casing 8 in telescoping engagement with cylindrical shaft extension $d'$ by the provision of an axial bore 10a and extends beyond clutch casing 8 with its outer extremity formed with a polygonally shaped socket 11 to receive the correspondingly shaped polygonal shank of a working tool (not shown), such as a nut socket, or screw driver blade. Any suitable or known means, such as a ball and slide device 12, may be provided to hold the working tool in place.

The clutching mechanism proper includes a coupling member 13 fitting the polygonally shaped portion $d$ of the spindle and locked thereon by suitable means, such as the pin 14. The lower face of the member 13 is provided with an annular series of clutch teeth 15 which are arranged to engage similar teeth 16 on a coupling member 17 which is mounted for rotation upon the upper end of tool shaft 10 through the provision of a series of balls 18 received in an annular runway 18a formed by registering grooves provided in the exterior surface of shaft 10 and the interior surface of member 17.

Access to the balls 18 is had through a radial bore which is normally closed by a plug 19. Inasmuch as coupling member 17 rotates freely through the action of balls 18 upon shaft 10, a shaft coupling member 20 is provided which is slidably mounted upon shaft 10 but is keyed thereto against rotation by a series of balls 21 disposed in axial grooves 22 formed partly in the coupling member 20 and partly in shaft 10. By preference a plurality of such axial grooves is provided, such as 3, as indicated in Figs. 3, 5, and 7. The opposed faces of intermediate member 17 and shaft member 20 are provided with clutch teeth 17a and 20x respectively. Cooperating engaging teeth 17a and 20a project only slightly from the faces of their respective coupling members (Figs. 1, 2a, and 3a) as compared with the clutch teeth 15 and 16 on the lower face of member 13 and upper face of member 17 respectively. Moreover, teeth 17a and 20a are not only irregular as to size but are irregularly spaced as indicated in Figs. 2 and 3 so that the number of positions in one rotation in which the teeth will mesh is much smaller than the number of positions in which teeth 15 and 16 will mesh. By preference and as shown teeth 17a and 20a are arranged to mesh only once during one rotation.

Teeth 15 and 16 are normally held out of mesh, as indicated in Fig. 1, through the provision of a coil spring 23 disposed in bore 10a of shaft 10. On the other hand teeth 17a and 20a are normally always in mesh, or at least in contact, through the action of a coil spring 24 encircling the exterior of shaft 10 and engaging at one end the slidable coupling member 20 and at the other the adjusting nut 25 disposed adjacent the tool retainer slide 12. Nut 25 may be locked in adjusted position by a plunger 26 which has a pin extension 26a arranged to be projected into an axial slot 27 (of which there may be several if close adjustment is desired) provided in the shaft 10 for this purpose. A spring ring 28 seated in a peripheral recess 25a in the nut 25 prevents accidental displacement of locking plunger 26.

In operation a working tool, such as a nut socket (not shown) having been secured in recess 11 of shaft 10 and the nut socket having been placed over the nut to be driven, pressure is exerted manually or otherwise against the driving motor C, or gear case B, forcing shaft 10 within casing 8 until teeth 16 of the intermediate coupling member 17 mesh with teeth 15 on the spindle coupling 13. The clutch teeth 17a on the lower side of intermediate member 17 are already held in meshing engagement with teeth 20a on shaft member 20 by the action of spring 24, or will come into meshing engagement upon completion of a partial revolution of member 17. The rotation of the motor will then be transmitted through spindle D and coupling members 13, 17, and 20 to tool shaft 10 which acts upon the nut through the nut socket. When the nut is driven home, the resistance of the latter to the turning movement of the motor will cause the shallow clutch teeth 17a and 20a to disengage against the pressure of spring 24 and these clutch teeth will ride upon each other, thus relieving the operator or the machine support from all strain since no torque whatever is then being transmitted to the nut. Member 17 continues to revolve while member 20 remains stationary. The pressure on the motor C or gear case B is then relieved and this permits spring 23 to move tool shaft 10 forwardly in casing 8 to the position shown in Fig. 1 thereby disengaging clutch teeth 15 and 16. If the pressure is not promptly removed, intermediate member 17 will continue to revolve while member 20 remains stationary due to the fact that the teeth on the engaging faces of these members coincide with the spaces therebetween only once during a complete revolution. At that time the teeth will engage momentarily only to be thrown out again because the tool shaft is locked by the nut which has already been driven home against the work and this will manifest itself to the operator by the sound of the jaws de-clutching and indicate that the pressure on the mechanism should be released.

While the teeth 17a and 20a are shown in Figs. 2 and 3 as formed with radial sides, an infinite number of jaw combinations are possible varying from one pair of jaw teeth to many pairs of jaw teeth of different widths and different angular spacings and contours. By way of illustration, other tooth shapes and arrangements are shown in Figs. 4 and 5 and Figs. 6 and 7 respectively. In Figs. 4 and 5 teeth 17b on member 17' and teeth 20b on member 20' are radial, not to the axis of the spindle, but to a center which is eccentric to the axis of rotation. In Figs. 6 and 7 the jaw faces 17c of member 17'' and the jaws 20c of member 20'' have sides tangent to a small circle whose center lies in the axis of rotation.

While the invention has been herein disclosed in what is now considered to be preferred forms, it is to be understood that the invention is not limited to the specific details thereof but covers all changes, modifications, and adaptations within the scope of the appended claims.

I claim as my invention:

1. A coupling member for use in a clutch assembly comprising an annular member having oppositely directed faces, clutch teeth on said faces, the teeth on one face being of the same size and shape and equally spaced to permit meshing engagement in several positions of rotation, the teeth on the other face being of low or slight projection and extending radially of said face for the full width thereof, said last named teeth varying in size, shape, and spacing so as to provide for meshing engagement in one position of rotation only.

2. In clutch mechanism of the automatic throw out type, two clutch members movable relative to one another and complemental clutch teeth on the opposed faces of said members, said teeth being of low or slight projection but extending radially or substantially radially of said faces for the full width thereof, said teeth varying in size, shape and spacing so as to provide for meshing engagement in one position of rotation only of said members.

Signed by me at Cleveland, in the county of Cuyahoga and State of Ohio this 17th day of September 1928.

WILLIAM H. CALLAN.